United States Patent
Aschoff et al.

(10) Patent No.: US 6,957,658 B2
(45) Date of Patent: Oct. 25, 2005

(54) FUEL TANK INSTALLATION

(75) Inventors: Wolfgang Aschoff, deceased, late of Stuttgart (DE); by Barbara Aschoff, legal representative, Duderstadt-Desingerode (DE); by Dorothea Aschoff, legal representative, Esslingen (DE); by Henning Aschoff, legal representative, Duderstadt-Desingerode (DE); Jürgen Kraus, Esslingen (DE); Wolfgang Liebhart, München (DE)

(73) Assignee: DaimlerChrysler AG, Stuttgart (DE)

( * ) Notice: Subject to any disclaimer, the term of this patent is extended or adjusted under 35 U.S.C. 154(b) by 207 days.

(21) Appl. No.: 10/601,130

(22) Filed: Jun. 20, 2003

(65) Prior Publication Data

US 2004/0256006 A1 Dec. 23, 2004

(30) Foreign Application Priority Data

Jun. 20, 2002 (DE) .............................. 102 27 524

(51) Int. Cl.$^7$ ............................................ F16K 24/04
(52) U.S. Cl. ................... 137/202; 137/587; 137/588
(58) Field of Search ............................. 137/202, 587, 137/588

(56) References Cited

U.S. PATENT DOCUMENTS

| | | | |
|---|---|---|---|
| 4,869,283 A | * | 9/1989 | Oeffling et al. ............... 137/43 |
| 6,557,581 B2 | * | 5/2003 | Ehrman et al. ............. 137/587 |
| 6,604,539 B1 | * | 8/2003 | Strohmayer et al. ........ 137/587 |
| 6,655,403 B2 | * | 12/2003 | Mills .......................... 137/587 |
| 2002/0083974 A1 | * | 7/2002 | Duermeier et al. ......... 137/202 |

FOREIGN PATENT DOCUMENTS

| | | |
|---|---|---|
| DE | 34 42 149 | 5/1986 |
| DE | 299 18 789 | 4/2000 |
| DE | 199 56 931 | 5/2001 |
| DE | 199 56 582 | 6/2001 |
| JP | 10 225015 | 8/1998 |

* cited by examiner

*Primary Examiner*—Gerald A. Michalsky
(74) *Attorney, Agent, or Firm*—K. Bach

(57) ABSTRACT

In a fuel tank installation including a fuel tank with an expansion volume, a filler neck connected to the fuel tank below a maximum fuel level of the tank for refueling the tank, a fill vent line for venting the fuel tank during refueling and an operating vent line for venting an expansion volume of the tank, the operating vent line extends within the fuel tank from the expansion volume of the fuel tank to a central penetration location and, at the central penetration location, through the wall of the tank together with the fill vent line.

7 Claims, 2 Drawing Sheets

FUEL TANK INSTALLATION

BACKGROUND OF THE INVENTION

The invention relates to a fuel tank installation, particularly for a motor vehicle, comprising a fuel tank with a filler neck extending to the fuel tank below a maximum fuel level in the tank, a fill vent line for venting the fuel line during refueling and an operating vent line for venting an expansion volume in the fuel tank above the maximum fuel level.

DE 34 42 149 A1 discloses a fuel tank installation for a motor vehicle including a fuel tank with a filler neck connected to the fuel tank below its maximum fuel level and a fill vent line for venting the fuel tank during refueling. The inlet end of the fill vent line is so arranged that an expansion volume remains above the maximum fuel level. This expansion volume is vented by three operating vent lines, which are associated with different chambers of the fuel tank. The ends of the operating vent lines within the fuel tank are disposed immediately below the top wall of the fuel tank. The operating vent lines and the fill vent line penetrate the wall of the fuel tank at different locations. Two of the operating vent lines and the fill vent line extend together outside the fuel tank to a vent container. From the vent container, the operating vent lines extend to a valve arranged on the filler neck. Upon insertion of the refueling nozzle into the filler neck, the valve closes all the operating vent lines. In this way, the maximum fill level of the fuel tank is determined by the position of the inlet end of the fill vent line.

It is the object of the present invention to provide a simplified fuel tank installation with a fuel tank and with a tank venting arrangement.

SUMMARY OF THE INVENTION

In a fuel tank installation including a fuel tank with an expansion volume, a filler neck connected to the fuel tank below a maximum fuel level of the tank for refueling the tank, a fill vent line for venting the fuel tank during refueling and at least one operating vent line for venting the expansion volume of the tank, the at least one operating vent line extends from an expansion volume of the fuel tank within the fuel tank to a central penetration location and, at the central penetration location, through the wall of the tank together with the fill vent line.

With this arrangement only a single penetration through the wall of the fuel tank is necessary for the operation vent line or lines and the fill vent line. As a result, the number of possible leakage locations, specifically the sources of possible HC emissions are reduced. Also, the construction expenses are lowered since only one penetration through the wall of the fuel tank is to be provided and to be sealed.

In a particular embodiment of the invention, at least one operating vent line is provided at its end remote from the central penetration with a float valve.

With this arrangement, fuel cannot flow into the operating vent line even if the vehicle is in an inclined position or when cornering even if the vent line has sections arranged below the maximum fuel level.

In the central penetration location preferably the at least one operating vent line is connected to the fill vent line.

In that case, the fill vent line can form an extension of the operating vent line and also serve as a degasification volume for the operating vent line. An additional operating vent line outside the fuel tank and an additional degasification container outside the fuel tank are therefore not necessary. As a result, again construction expenses are reduced and possible leakage locations are eliminated. In addition, vehicle safety is increased, since there are fewer lines arranged outside the tank, which could be ripped off during an accident.

Preferably, a float valve is provided at the central penetration location which blocks the fill vent line or provides for communication of the fill vent line with the fuel tank.

The float valve blocks the fill vent line when the maximum fuel level in the tank has been reached so that no further refueling is possible. Since the float valve is arranged in the area of the central penetration location, important functional units can be concentrated at the central penetration location.

Expediently, the at least one operating vent line extends to an operating vent chamber which is disposed in the area of the central penetration location and which is in communication with the fill vent line.

The provision of the operating vent chamber has the advantage that several operating vent lines can be connected in a simple manner and that a pressure compensation between the several operating vent lines and, consequently, the various chambers of the fuel tank is possible.

Preferably, the operating vent chamber is of annular shape. In this way, operating vent lines extending to the operating vent chamber from different directions can be easily connected.

In a particular embodiment, the annular operating vent chamber extends around the end opening of the fill vent line, which is provided with a float valve for blocking the opening when the fuel reaches the maximum fill level.

Also means may be provided permitting the selective blocking of the operating vent line communication with the fill vent line.

By blocking communication between the operating vent lines and the fill vent line particularly during refueling the operating venting process is blocked whereby it is made sure that the expansion volume cannot be filled with fuel.

Preferably, the means for the selective closing of the operating vent lines is an electrically operable valve, which is preferably arranged within the tank volume.

This provides for a space-saving arrangement. By arranging the means for the selective closing within the tank volume, any required line connections or extensions may be disposed within the tank so that the number of potential leakage locations outside the fuel tank and consequently the number sources of potential HC emissions are minimized.

Further features and advantage of the invention will become more readily apparent from the following description thereof with reference to the accompanying drawings.

DESCRIPTION OF PARTICULAR EMBODIMENTS OF THE INVENTION

Figure 1:
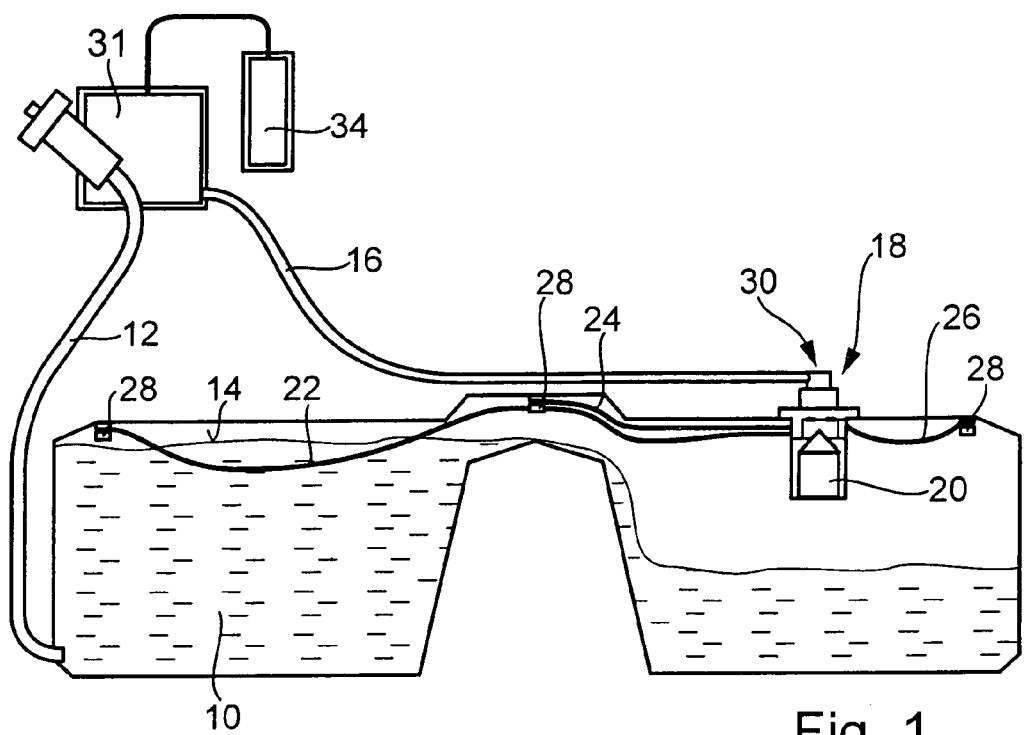
FIG. 1 is a schematic representation of a particular embodiment of a fuel tank installation according to the invention.

FIG. 1 shows a fuel tank installation including a fuel tank 10 in the form of a saddle tank. A filler neck 12 is connected to the fuel tank 10 below the maximum fill level 14 of the fuel tank 10. To permit refueling of the tank 10, therefore a fill vent line 16 is required by way of which the interior of the fuel tank 10 is vented during the refueling procedure. The inlet opening of the fill vent line 16 in the fuel tank 10 is provided with a float valve 18 in such a way that a float 20 closes or blocks the fill vent line 16 when the fuel level in the tank 16 reaches the maximum fill level 14. Above the maximum fill level 14, there is an expansion volume so that, even with the tank 10 filled to the maximum fill level 14, the fuel contained in the tank can expand upon heating. In this way, overflow of fuel, that is spilling through the fill vent line 16, at high ambient temperature is avoided. But also the expansion volume must be sufficiently vented since a gas mixture of air and fuel vapors is formed in the expansion volume whose pressure may reach substantial values at high ambient temperatures. In order to prevent such pressure rises a so-called operating vent system is provided. The operating vent system is formed by the three operation vent lines 22, 24 and 26.

The operating vent lines 22, 24 and 26 extend within the fuel tank to a central penetration location 30. Because of the float valves 28, the operating vent lines may have sections which extend below the maximum fill level of the fuel in the tank. At the central penetration location, the tank 10 has an opening in which the float valve 18 is mounted. The float valve 18 includes a float member 20 and also an operating vent chamber, to which the operating vent lines 22, 24, and 26 are connected and which is also in communication with the fill vent line 16. In this way, an excess pressure formed in the expansion volumes can be released by way of the operating vent lines 22, 24, and 26 to the fill vent line 16 and to a compensation container 31 and from there to an activated carbon filter 34.

The operating vent lines 22, 24 and 26 extend within the fuel tank to a central penetration location 30. Because of the float valves 28, the operating vent lines may have sections which extend below the maximum fill level of the fuel in the tank. At the central penetration location, the tank 10 has an opening in which the float valve 18 is mounted. The float valve 18 includes a float member 20 and also an operating vent chamber, to which the operating vent lines 22, 24, and 26 are connected and which is also in communication with the fill vent line 16. In this way, an excess pressure formed in the expansion volumes can be released by way of the operating vent lines 22, 24, and 26 to the fill vent line 16 and to a compensation container 32 and from there to an activated carbon filter 34.

The cross-section of the fill vent line 16 is substantially larger than the cross-section of an operating vent lines 22, 24, 26. For example, the cross-section of the fill vent line 16 is at least twice that of the cross-section of an operating vent line 22, 24, 26. As a result, the fill vent line can also be used as a separation volume for the operating vent line where fuel vapors are separated from any fuel carried along. An additional vent chamber outside the fuel tank 10 for the vent lines 22, 24, and 26 is therefore not needed.

Figure 2:
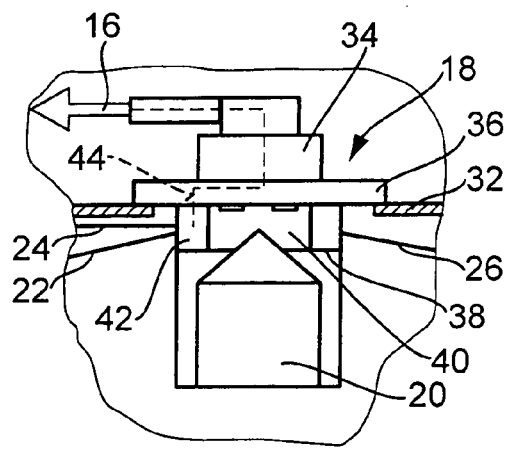
FIG. 2 shows a in detail a venting control device of the fuel installation shown in FIG. 1.

FIG. 2 shows the float valve 18 in an enlarged representation. It is apparent that the float valve 18 is mounted in an opening in the wall 32 of the fuel tank 10. The float valve 18 includes a housing 34 around which a flange 36 extends which is disposed on the outer surface of the wall 32 of the fuel tank 10. The housing 34 extends into the fuel tank 10. In the fuel tank 10, the housing 34 includes a float 20 so as to movable therein.

The float 20 is cylindrical and has a conical top end. If the fuel level in the fuel tank 10 rises above the maximum fill level 14, the cone-like end of the float 20 engages an annular flange 38 of the housing 34. The annular flange 38 forms the end of a channel 40 extending through the housing 34 which channel is an extension of the fill vent line 16 through the housing 34 and into the interior of the fuel tank.

In the part next to the annular flange 38, the channel 40 is surrounded by an annular operating vent chamber 42, to which the operating vent lines 22, 24, and 26 extend. When the float 20 engages the annular flange 28, the operating vent chamber 4 is in communication with the interior of the fuel tank 10 only by way of the operating vent lines 22, 24, 26. As indicated by a dashed line 44, however, the operating vent chamber 42 is in communication with the channel 40 in the housing 34 and, consequently, with the fill vent line 16. When the float 20 is in engagement with the annular flange 38 and, consequently, communication between the fill vent line 16 and the interior of the fuel tank is interrupted, the interior of the fuel tank is still in communication with the fill vent line by way of the operating vent lines 22, 24 and 26 and the operating vent chamber 42, so that operating venting remains in effect.

The representations of FIG. 1 and FIG. 2 show that a single penetration in the fuel tank wall at the central location 30 is sufficient for the proper functional connection of the fill vent line 16 as well as the operating vent lines 22, 24, and 26.

Figure 3:
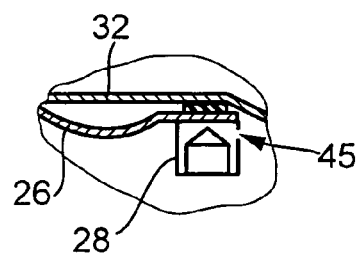
FIG. 3 shows a particular float valve as used for the operating vent lines.

FIG. 3 shows one of the operating vent float valves 28 in an enlarged representation. Each float valve 28 includes a cylindrical float body with a conical end. When the fuel level rises, the buoyancy of the float body biases the cone-like end of the float body into engagement with an opening in the housing of the float valve 28, which opening is in communication with one of the operating vent lines 22, 24, 26. The float body is arranged in a float chamber, which is in communication with the interior of the fuel tank 10 by way of a bore 45. By appropriate selection of the size of the bore 45, the operating vent line can be throttled. The housing of the float valve 28 is connected to the inside of the fuel tank wall 32 in such a way that no bore is required in the wall 32 of the fuel tank. For example, the housing of the float valve 28 may be welded or cemented onto the fuel tank wall. In this way, no additional bores need to be drilled through the wall of the fuel tank, which may form potential leakage locations and potential discharge locations for HC emissions.

Figure 4:
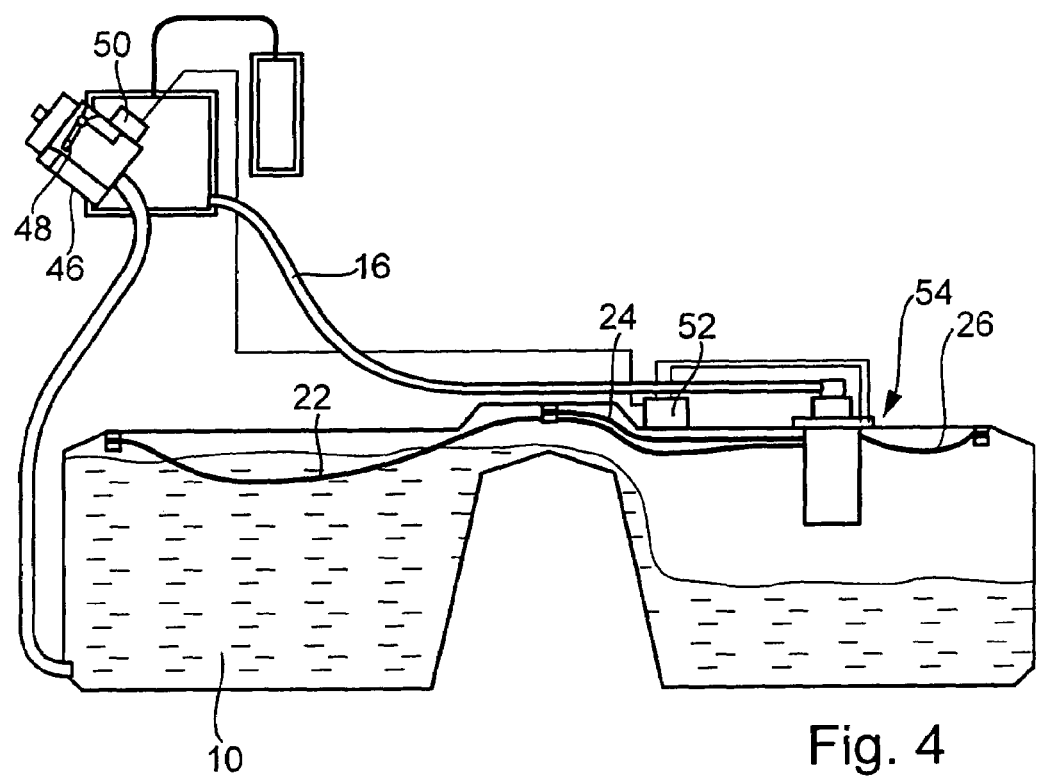
FIG. 4 is a schematic representation of a second, preferred embodiment of the fuel installation.

FIG. 4 shows schematically a preferred embodiment of the fuel tank installation according to the invention. Components of this embodiment which are the same as those of the embodiment shown in FIG. 1 are designated by the same reference numerals and are not again described. Different from the embodiment of FIG. 1, the fuel tank installation according to FIG. 4 includes means for closing the operating vent lines 22, 24, and 26 during refueling of the fuel tank 10. As a result, the liquid level cannot rise during refueling above the maximum fill level 14. To this end the filler head 46 includes a so-called lead-free flap 48, which is pivoted away upon insertion of the refueling nozzle. At the same time, the cross-section of the filler head is reduced by the lead-free flap or rather the surrounding parts to such an extent that only a standard lead-free filler nozzle can be inserted. By way of a sensor 50, the pivot position of the lead-free flap 48 can be determined. An output signal of the sensor 50 is supplied to a control unit 52. The control unit 52 controls an electric control valve in a float valve 54. By way of the electric control valve in the float valve 54, communication with the operating vent lines 22, 24, and 26 and the fill vent line 16 can then be blocked or established depending on the output signal received from the sensor 50.

Figure 5:
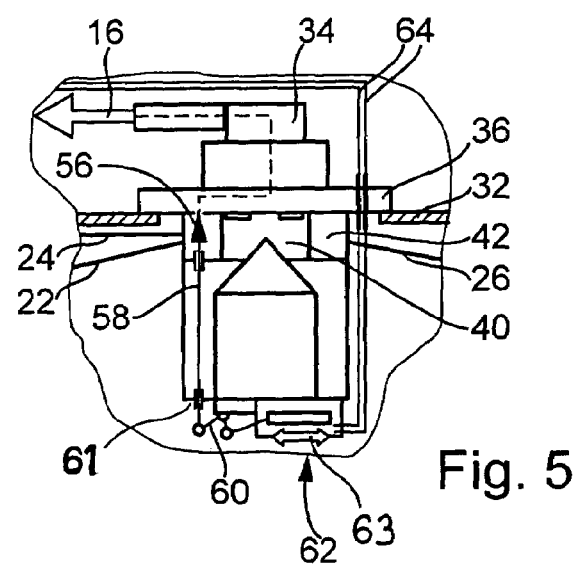
FIG. 5 shows in detail a venting control device of the fuel installation shown in FIG. 4.

The float valve 54 shown in FIG. 4 is shown in greater detail in FIG. 5. The float valve 54 is in principle similar to the float valve 18 shown in FIGS. 1 and 2 and equal design element are therefore indicated by the same reference numerals and are not again explained. The operating vent lines 22, 24 and 26 open into the operating vent chamber 42. Communication between the operating vent chamber 42 and the channel 40 within the housing 34, which is in communication with the fill vent line 16, can be established or blocked by the schematically shown cone element 56. To this end, the cone element 56 is disposed on an operating rod 58, which as shown in FIG. 5 is supported so as to be movable in vertical direction. A penetration 61 of the operating rod 58 through the lower wall of the operating vent chamber 42 is sealed by means of a seal. The operating rod 58 is actuated by way of a lever 60, which is operated by an electric actuator 62.

The electric actuator 62 is for example a solenoid with a core, which is movable in the direction as indicated in FIG. 5 by the double arrow 63. As pointed out earlier, the electric actuator 62 is controlled by the control unit 52 via two electric control lines 64. It is noted that the electric control lines 64 extend through the flange 36 of the housing 34 so that no additional bore is needed in the wall 32 of the fuel tank. Movement of the core of the electric actuator 62 results in a pivot movement of the two-armed lever 60, which is pivotally supported on the housing 34, and in an axial displacement of the operating rod 58. By controlling the actuator 62 therefore, the communication path between the operating vent chamber 42 and the fill vent line 16 shown in FIG. 5 by the dashed line 44 can therefore be established or closed.

What is claimed is:

1. A fuel tank installation, comprising: a fuel tank with an expansion volume, a filler neck extending to the fuel tank for refueling the fuel tank, a fill vent line in communication with the fuel tank for venting the fuel tank during refueling, and operating vent means for venting the expansion volume disposed above a maximum fill level of the fuel in the fuel tank, said operating vent means including at least one operating vent line extending from at least one expansion volume within the fuel tank to a central penetration location and, at the central penetration location, together with the fill vent line, through a wall of the fuel tank, said central penetration location including an annular operating vent chamber to which said at least one operating vent line is connected, said annular operating vent chamber being in communication with the fill vent line extending around a space forming the inlet end of the fill vent line, which is larger in diameter than said operating vent line, so as accommodate the relatively large vent gas flow during refueling, the fill vent line serving during normal engine operation as liquid-gas separation chamber for the vent gases from the operating vent line.

2. A fuel tank according to claim 1, wherein said at least one operating vent line is provided with a float valve at its inlet end remote from the central penetration.

3. A fuel tank according to claim 1, wherein said at least one operating vent line is connected in the area of the central penetration to said fill vent line.

4. A fuel tank according to claim 3, wherein at the central penetration area a float valve is provided in the space forming the inlet end of the fill vent line which provides for, or blocks, communication between the fuel tank and the fill vent line.

5. A fuel tank according to claim 1, wherein means are provided for selectively blocking communication between the operating vent chamber and the fill vent line.

6. A fuel tank according to claim 5, wherein the means for selectively blocking communication between the operating vent chamber and the fill vent line is an electrically controllable valve.

7. A fuel tank according to claim 5, wherein the means for selectively blocking communication between the operating vent chamber and the fill vent line is disposed within the fuel tank.

* * * * *